United States Patent [19]

Takizawa et al.

[11] Patent Number: 5,652,833
[45] Date of Patent: Jul. 29, 1997

[54] METHOD AND APPARATUS FOR PERFORMING CHANGE-OVER CONTROL TO PROCESSOR GROUPS BY USING RATE OF FAILED PROCESSORS IN A PARALLEL COMPUTER

[75] Inventors: Mitsuyoshi Takizawa; Akinori Minamisawa; Yasushi Meguro; Natsuro Tanaka, all of Hadano, Japan

[73] Assignees: Hitachi, Ltd.; Hitachi Information Network, Ltd.; Hitachi System Engineering, Ltd., all of Tokyo, Japan

[21] Appl. No.: 401,261

[22] Filed: Mar. 9, 1995

[51] Int. Cl.⁶ .................................................. G06F 15/16
[52] U.S. Cl. .................................................. 395/182.08
[58] Field of Search .................... 395/182.08, 375, 395/650, 700; 371/72; 364/474.16, 474.19, 551.01, 228.3, 230, 230.3, 264, 264.4, 268, 268.3, 268.9, 269.2, 281.9, 285.3, 944.61, 949.4

[56] References Cited

U.S. PATENT DOCUMENTS

| | | | |
|---|---|---|---|
| 5,129,077 | 7/1992 | Hillis | 395/500 |
| 5,214,652 | 5/1993 | Sutton | 371/9.1 |
| 5,251,299 | 10/1993 | Masuda et al. | 395/200 |
| 5,313,625 | 5/1994 | Hess et al. | 395/575 |
| 5,432,715 | 7/1995 | Shigematsu et al. | 364/551.01 |
| 5,440,728 | 8/1995 | Fujiwara | 395/419 |

FOREIGN PATENT DOCUMENTS

3-132861  6/1991  Japan .................. G06F 15/16

*Primary Examiner*—Robert W. Beausoliel, Jr.
*Assistant Examiner*—Stephen C. Elmore
*Attorney, Agent, or Firm*—Antonelli, Terry, Stout & Kraus, LLP

[57] ABSTRACT

In a change-over control method for a parallel processor system including a current processor group having a plurality of processors and a network connecting the processors to each other and a standby processor group configured in the same way as for the current processor group, a processor control section is disposed in the parallel processor system, and a monitor processor is arranged for each of the current and standby processor groups. A faulty processor ratio determined according to the amount of job processing is set to the processor control section. On receiving a report notifying occurrence of a failure in a processor from the monitor processor disposed in the current processor group, the processor control section determines a ratio of failed processors in the current processor group. When the ratio is equal to or more than the faulty processor ratio, the processor control section effects a change-over operation of transferring job processing from the current processor group to the standby processor group.

15 Claims, 7 Drawing Sheets

| LOGICAL ADDRESS | 1 | 2 | · | · | · | n |
|---|---|---|---|---|---|---|
| PHYSICAL ADDRESS (CURRENT PROCESSOR GROUP) | 1 | 2 | · | · | · | n |
| PHYSICAL ADDRESS (STANDBY PROCESSOR GROUP) | n+1 | n+2 | · | · | · | 2n |

FIG.4

| TIME (h) | 0 | ... | 9 | ... | 17 | ... | 24 |
|---|---|---|---|---|---|---|---|
| FAULTY PROCESSOR RATIO (%) | 50 | ... | 25 | ... | 50 | ... | 50 |

METHOD AND APPARATUS FOR PERFORMING CHANGE-OVER CONTROL TO PROCESSOR GROUPS BY USING RATE OF FAILED PROCESSORS IN A PARALLEL COMPUTER

BACKGROUND OF THE INVENTION

The present invention relates to a parallel processor system including a current processor group including current processors and a standby processor group including standby processors and, in particular, to a parallel processor system and a change-over control method of the parallel processor system in which a change-over control operation is achieved from the current processor group to the standby processor group when a failure occurs in some processors in the current processor group.

According to a conventional parallel processor system, when a failure occurs during a job in a processor or some processors, the faulty processor or processors is or are removed from the running system configuration such that the job processing is executed by the remaining processors in a degenerated state. However, in the degenerated system operation, the number of available processors is decreased and hence the job processing performance is lowered in the overall parallel processor system. In some cases, this possibly leads to a case in which some jobs cannot be conducted fully or properly.

To prevent the disadvantageous event, there has been described in the JP-A-3-132861 a technology in which a plurality of processors constituting a parallel processor system are grouped into blocks, each including several processors such that anywhere from one processor to several processors (of which the number is less than that of the processors in the pertinent group) are assigned as standby processors for the group. When a processor fails in a block, the processor is replaced with the standby processor thus prepared in advance.

Moreover, there has also been known a technology in which a parallel processor system includes a group of current processors to ordinarily execute job processes and a group of standby processors of which the number of processors is equal to that of the current processors. When a failure occurs in a processor of the current processor group, a change-over operation is conducted to substitute the standby processor group for the current processor group so as to continuously achieve the job processing.

In both of these technologies, when a processor fails, a standby processor or a standby processor group is used to continue the job process. Consequently, the number of processors responsible for execution of the processing is not decreased and hence the overall processing performance of the parallel processor system is kept unchanged.

In the first technology above, when the number of failed processors exceeds that of standby processors of the pertinent processor group, the number of processors to actually execute processing is resultantly decreased as compared with the number of processors available in the normal state. This leads to a problem of deterioration in the processing performance of the overall parallel processor system.

Moreover, in the second technology described above, even when a failure occurs in a plurality of processors, the number of available processors is not lowered. However, even when only a processor fails, the current processor group is replaced with the standby processor group. Consequently, for example, with respect to the job processing capacity, even when the job can be satisfactorily carried out by the remaining processors, there is effected a switching operation from the current processor group to the standby processor group, causing a problem that unnecessary change-over operations are frequently accomplished.

SUMMARY OF THE INVENTION

It is therefore a first object of the present invention to provide a change-over control method in which when one processor or a plurality of processors fails or fail in a parallel processor system, the current processor group is efficiently replaced by the standby processor group according to the amount of job processing while avoiding unnecessary change-over operations from the current processor group to the standby processor group.

A second object of the present invention is to provide a parallel processor system in which even when one processor or a plurality of processors fails or fail during a job process in a parallel processor system, the job can be continuously processed with a sufficient processing performance according to the quantity of job processing.

To achieve the first object according to the present invention, in a change-over control method for use with a parallel processor system including a current processor group having a plurality of processors and a network connecting the processors to each other and a standby processor group having a configuration equal to that of the current processor group, a processor control section is arranged in the parallel processor system to achieve a change-over operation from the current processor group to the standby processor group, a monitor processor is disposed for each of the processor groups, and a faulty processor ratio is set to the processor control section to indicate a reference value of the ratio of processors having failed in the current processor group, the ratio being decided according to the amount of job processing. On receiving a processor failure report from the monitor processor in the current processor group, the processor control section computes the ratio of processors having failed in the current processor group at the pertinent time. When the ratio is equal to or more than the faulty processor ratio, a change-over operation is effected from the current processor group to the standby processor group.

In order to achieve the second object according to the present invention, a parallel processor system having a current processor group including a plurality of processors and a network connecting the processors to each other and a standby processor group having a configuration identical to that of the current processor group are provided. Each of the processor groups includes a monitor processor to control information processing for each of the processors respectively of the pertinent processor groups and to detect and report failures occurring in a processor thereof. The system further includes a processor control section to carry out a change-over operation between the current and standby processor groups. The processor control section includes a scheduling table in which the determined faulty processor ratio determined is set according to the amount of job processing and a change-over control section for computing, when a report of occurrence of a failure is received from the monitor processor of the current processor group, a ratio of processors having failed in the current processor group at the pertinent point of time so as to compare the ratio with the faulty processor ratio set in the scheduling table. The change-over control section accomplishes a change-over operation from the current processor group to the standby processor group when the above ratio is equal to or more than the faulty processor ratio. Moreover, there is included an operator's console connected to the processor control section for arbitrarily setting the faulty processor ratio to the scheduling table.

In accordance with the present invention as described above, the change-over operation from the current processor group to the standby processor group is conducted on the basis of the faulty processor ratio assigned according to the job processing amount. Consequently, when a failure occurs in a processor of the current processor group, when the job can be satisfactorily achieved by the remaining processors, the job process is continuously executed. When the ratio of failed processors reaches the faulty processor ratio, the current processor group is replaced with the standby processor group. Consequently, the switching operation between the current and standby processor groups can be effectively carried out while efficiently maintaining the processing performance of each processor and the job processing can be executed with a sufficient processing performance.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
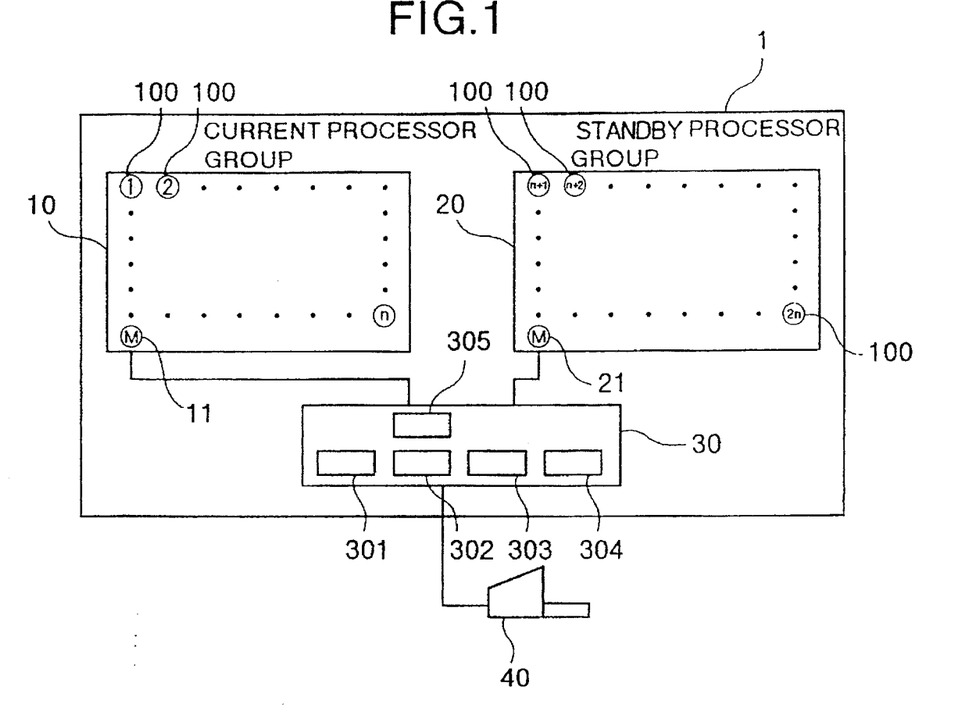
FIG. 1 is a block diagram showing an embodiment of the parallel processor system according to the present invention.

In FIG. 1, a parallel processor 1 according to the present invention includes a current processor group 10 for ordinarily conducting a job process and a standby processor group 20 which is substituted for the current processor group 10 through a change-over operation when a failure occurs in a processor of the current processor group 10 in order to continuously execute the job process. Each of the processor groups 10 and 20 includes n processors 100.

The parallel processor system 1 includes a processor control section 30 which controls configurations of the processor groups 10 and 20 and operation states of the respective processors 100, and the processor control section 30 further computes the ratio of failed processors in the current processor group 10. When the ratio reaches a predetermined faulty processor ratio, the processor control section 30 initiates a change-over operation from the current processor group 10 to the standby processor group 20. Namely, the section 30 includes a processor to primarily conduct the switching operation between the processor groups 10 and 20.

The current processor groups 10 includes a monitor processor 11, whereas the standby processor group 20 has a monitor processor 21. The processor control section 30 is logically linked with the monitor processors 11 and 21.

Figure 2:
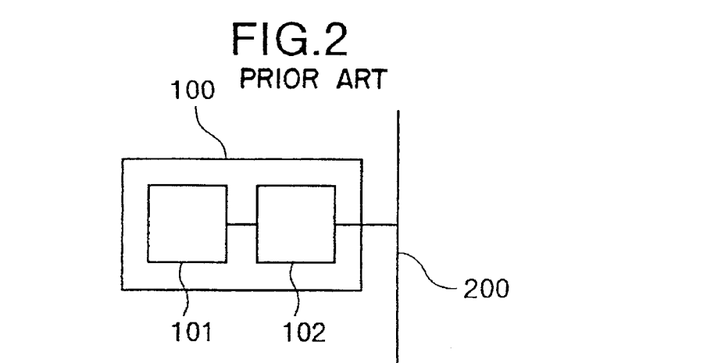
FIG. 2 is a block diagram showing a specific structure of a processor.

As can be seen from FIG. 2, each of the processors, including the processors 100 and monitor processors 11 and 21, includes a processor section 101 for actually executing processing and a communication control section 102 for achieving initiation and termination of communication with a network and recognizing logical addresses. In the processor groups 10 and 20 of FIG. 1, the processors 100 and monitor processors 11 and 21 are respectively connected to each other via a network bus 200 shown in FIG. 2. The monitor processors 11 and 21 as well as the processors 100 have the same constitution. The monitor processors 11 and 21 are not responsible for the job processing. The monitor processor 11 or 21 assigns processing to each processor 100 in its own processor group, controls the processing state and history thereof, detects the occurrence of failures in the processors 100, and notifies the failures to the processor 100 of the processor control section 30.

Figure 3:
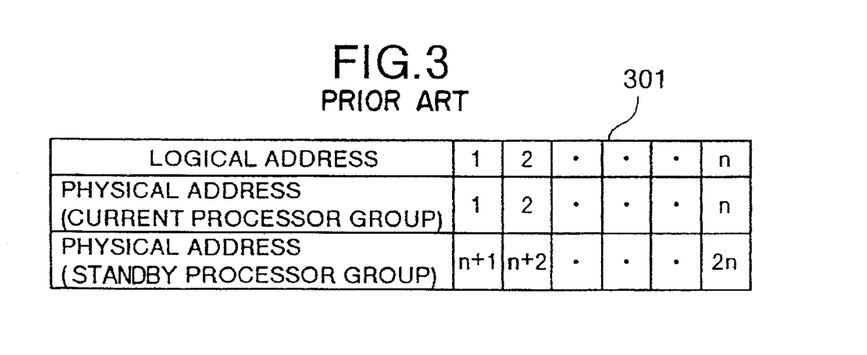
FIG. 3 is a table showing the contents of an address control table storing therein logical addresses and physical addresses related thereto.

The processor controller 30 includes an address control table 301 storing therein physical addresses 1 to 2n of the processors and logical addresses 1 to n associated therewith, a scheduling table 302 to which faulty processor ratio values determined according to the job processing amount are set, a timer 303 for measuring time, a storage section 304 for transferring the contents of processing from the current processor group 10 to the standby processor group 20, and a change-over control section 305 for determining and initiating a switching operation from the current processor group 10 to the standby processor group 20. As shown in FIG. 3, the address control table 301 stores therein physical addresses 1 to n of the respective processors 100 in the current processor group 10 and physical addresses n+1 to 2n thereof in the current processor group 20 with correspondence established between the physical and logical addresses. As can be seen from FIG. 4, the scheduling table 302 stores predetermined faulty processor ratio value at the pertinent points of time.

There is also disposed an operator's console 40 connected to the processor control section 30. From the console 40, the faulty processor ratio can be arbitrarily set to the scheduling table 302.

Description will next be given to operation of the parallel processor system 1 according to the embodiment.

Figure 4:
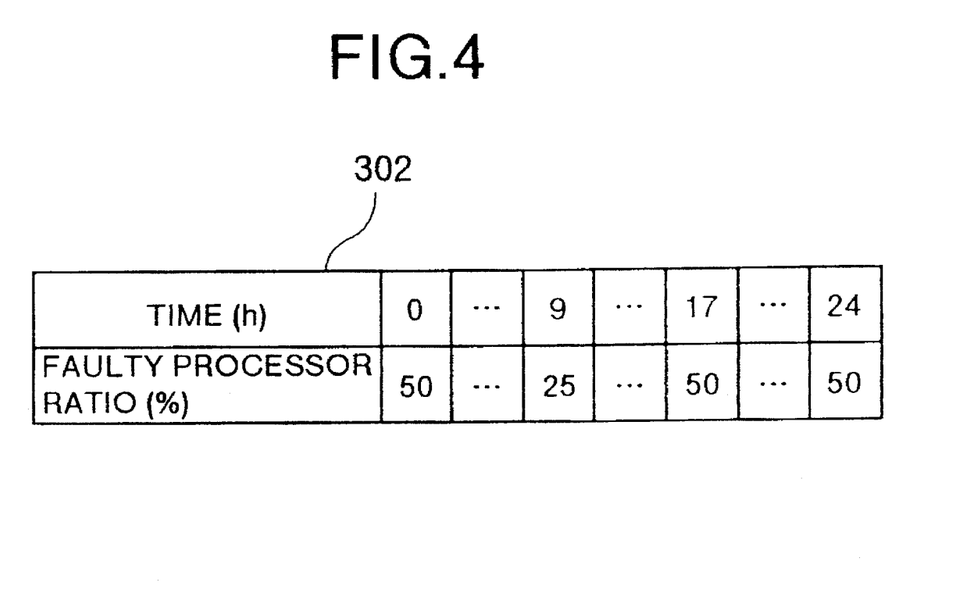
FIG. 4 is a table showing the contents of a scheduling table storing therein faulty processor ratio values set at predetermined points of time.
Figure 5:
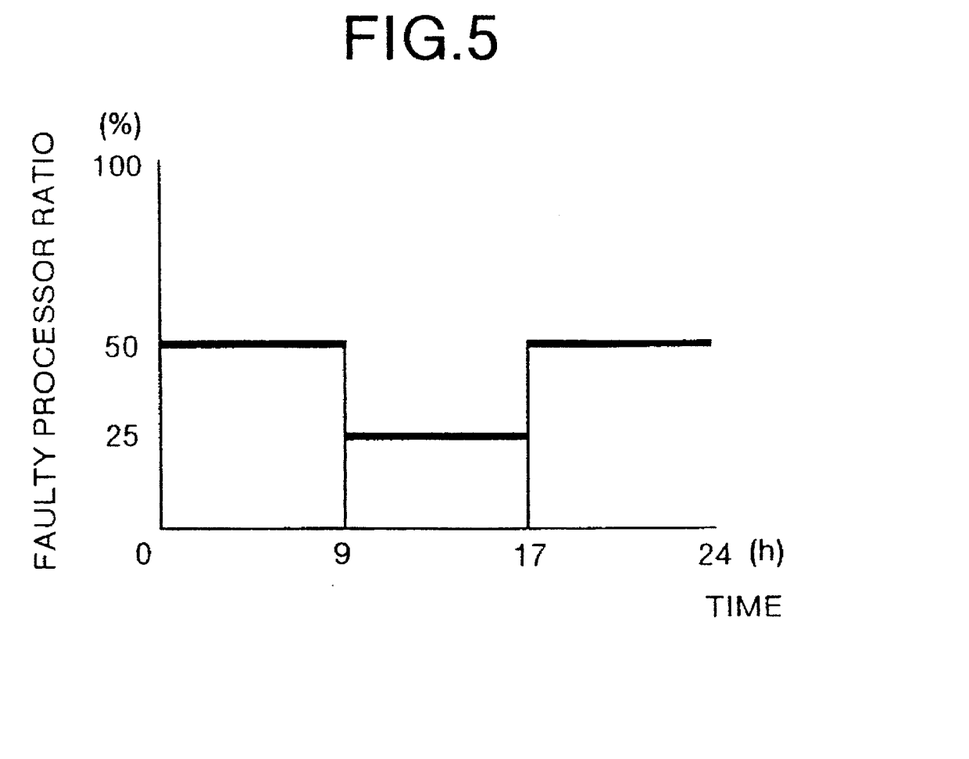
FIG. 5 is a graph showing the faulty processor ratio set at predetermined points of time.

In this embodiment, it is assumed as shown in FIGS. 4 and 5 that the values of faulty processor ratio indicating a switching operation from the current processor group 10 to the standby processor group 20 are set beforehand from the console 40 to the scheduling table 302 of the processor controller 30. Namely, the ratio is set to 50%, 25%, and 50% for the ranges from 0 h to 9 h, from 9 h to 15 h, and from 17 h to 24 h, respectively.

When executing a job processing in response to an external process request in the parallel processor system 1, the request is first received by the monitor processor 11 of the current processor group 10. The processor 11 classifies the received request into several processes to be assigned to the respective processors 100 of its own processor group 10.

At predetermined points, the monitor processor 11 writes such information items in the storage 304 of the controller 30 as allocation of processes to the processors 100, processing states thereof, and processing history (to be called processing information herebelow) thereof.

Each processor 100 supplies the monitor processor 11 at a fixed interval of time with a message indicating the normal operation state thereof. Examining the messages from the processors 100, the monitor processor 11 assumes a failure of a processor when the message is not received therefrom for a predetermined period of time and notifies occurrence of a failure of the processor 100 to the processor controller 30.

Figure 6:
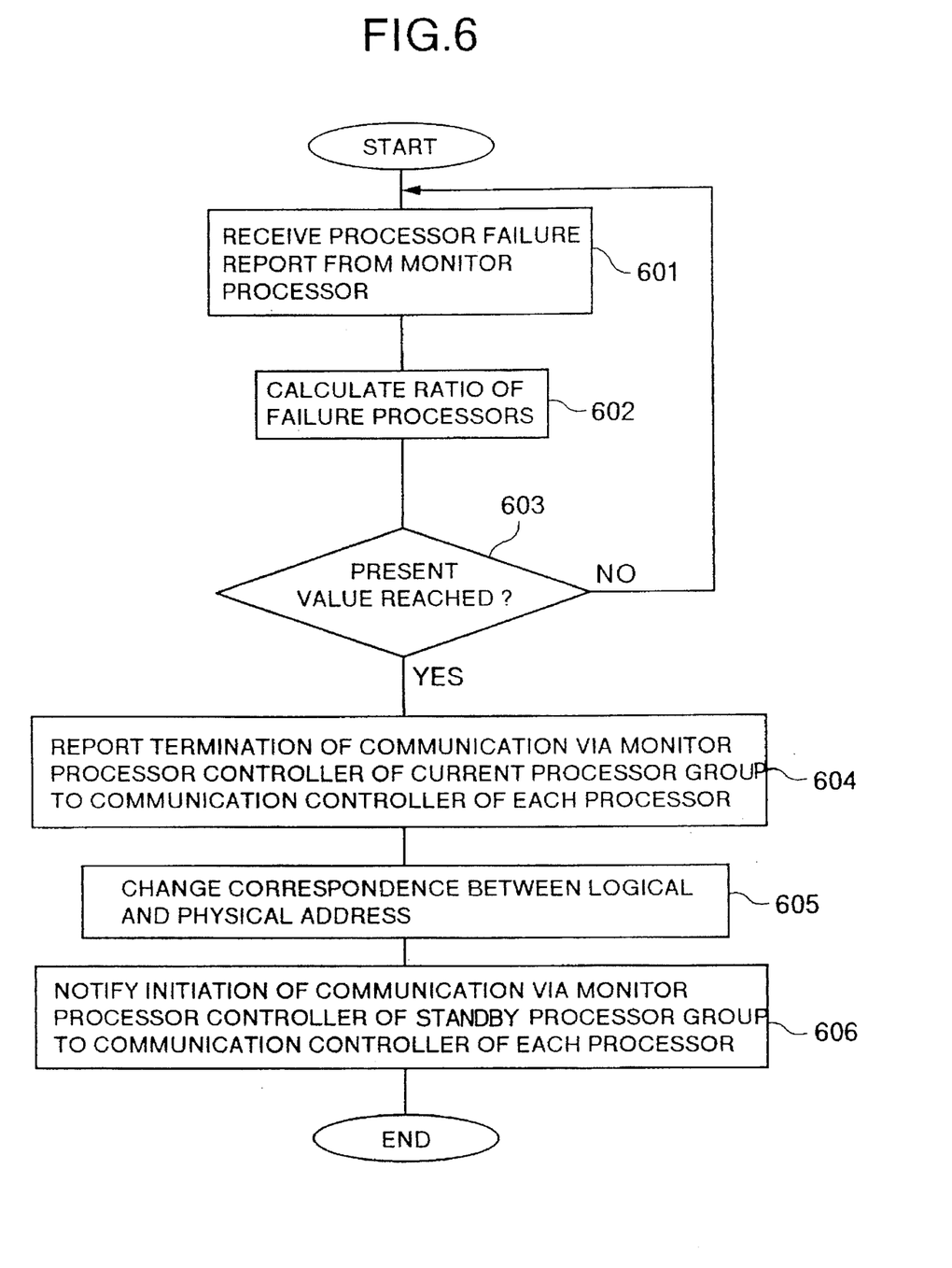
FIG. 6 is a flowchart showing operation of a processor control section in a processor group switching operation.

Referring now to FIG. 6, description will be given of operation of the processor control section 30 when a report of failure in the processor 100 is received from the monitor processor 11.

When the report of failure in the processor 100 is received from the monitor processor (step 601), the switching control section 305 computes the ratio of failed processors in the current processor group 10 at the pertinent point of time (step 602). The change-over controller 305 compares the computed ratio with a faulty processor ratio which is preset in the scheduling table 302 and which corresponds to a point of time indicated by the timer 303 (step 603). When the ratio is resultantly less than the faulty processor ratio, the switching operation from the current processor group 10 to the standby processor group 20 is not conducted. Namely, the switching controller 305 waits for reception of the next report from the monitor processor.

As a result of comparison, when the computed ratio is equal to or more than the faulty processor ratio, termination of communication is notified via the monitor processor 11 to the communication controller 102 of each processor 100 of the current processor group 10 (step 604). Referring thereafter to the address control table 301, the physical addresses corresponding to the respective logical addresses 1 to n are changed from the physical addresses of the respective processors 100 of the current processor group 10 to those of the respective processors 100 of the standby processor group 20 (step 605). Communicability as well as the logical addresses corresponding to the physical addresses of the respective processors 100 are then reported via the monitor processor 21 to the communication controller 102 of each processor 100 of the standby processor group 20 (step 606).

In response to the notification from the processor controller 30, the communication controller 102 of the processor 100 starts communication with the network and recognizes logical addresses denoted by the request. The monitor processor 21 then accesses the storage 304 of the processor controller 30 to read processing information of each processor written therein by the monitor processor 11. The monitor processor 21 receives allocation of processes to the respective processors 100 of the current processor group 10, notifies the processing history to each processor 100 of the standby processor group 20, and then transfers job processes of the processors 100 from the current processor group 10 to the standby processor group 20, thereby completing the entire switching operation.

Figure 7:
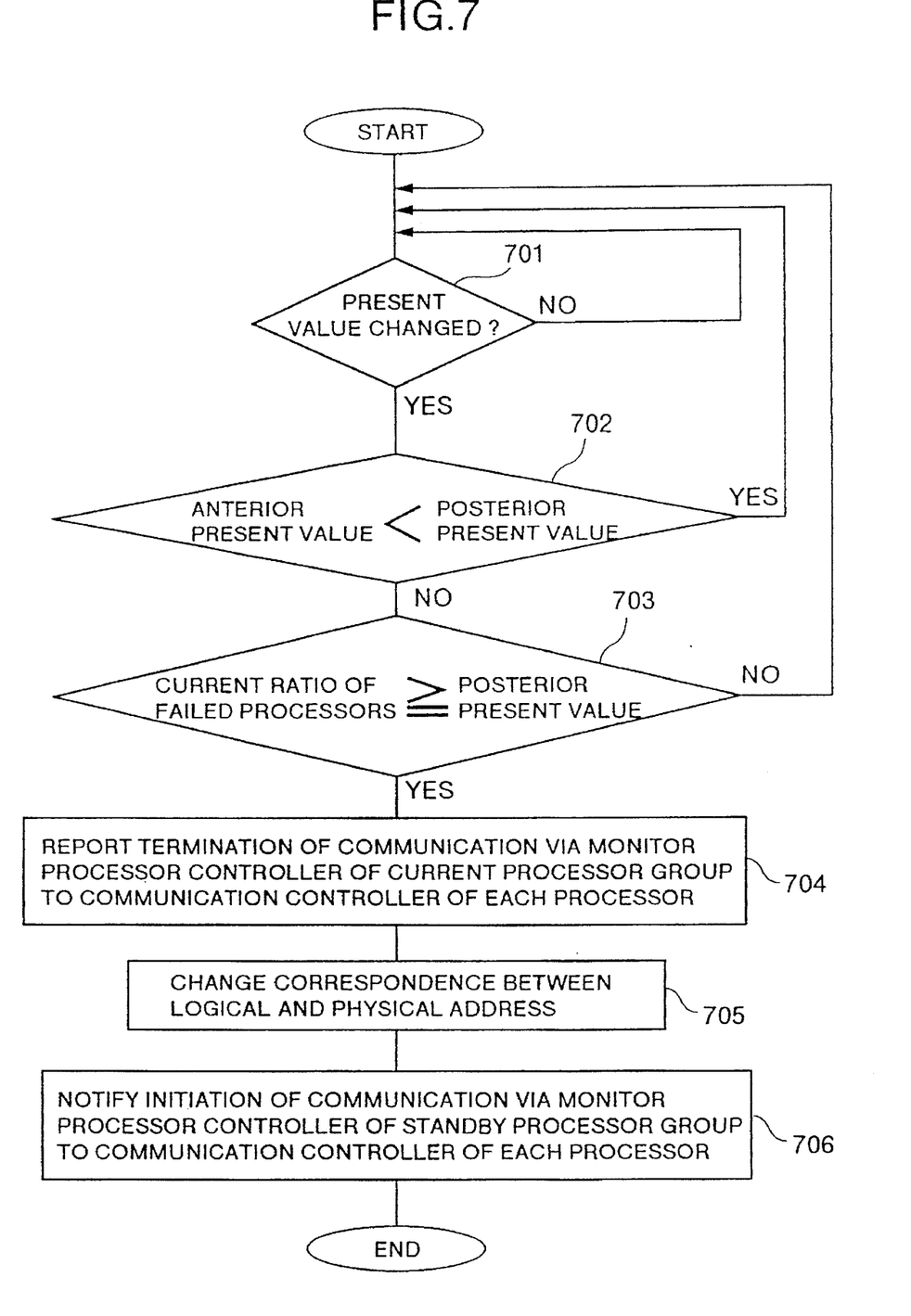
FIG. 7 is a flowchart showing operation of a processor control section when the faulty processor ratio is changed.

In the embodiment described above, when the report of failure of the processor 100 is received from the monitor processor 11, the processor controller 30 determines whether or not the change-over operation is to be executed from the current processor group 10 to the standby processor group 20. However, since the faulty processor ratio set to the scheduling table 302 takes various values at the respective points of time, even when a ratio of failed processors is less than the pertinent faulty processor ratio at a point of time, the ratio may possibly reach a faulty processor ratio at the next point of time. Consequently, it is necessary to appropriately accomplish the switching operation in the above case. Referring now to FIG. 7, description will be given of operation of the processor controller 30 in such a case.

Each time the timer 303 indicates a new point of time, the switching controller 305 makes a check to determine whether or not the faulty processor ratio is changed in the scheduling table 302 (step 701). In this embodiment, as can be seen from FIGS. 4 and 5, the faulty processor ratio is altered at two points, namely, 9 h and 17 h. Consequently, when the faulty processor ratio is changed (at 9 or 17 o'clock), the switching controller 305 compares the faulty processor ratio before the change point with the faulty processor ratio thereafter (step 702). When the anterior ratio is larger as a result of the comparison, the switching operation from the current processor group 10 to the standby processor group 20 is skipped. Namely, the switching controller 305 waits for reception of a failure report from the monitor processor 11 or a subsequent point of change of the faulty processor ratio.

As a result of the comparison, when the anterior ratio before the change is smaller, the ratio of failed processors 100 at the pertinent point of time is compared with the posterior faulty processor ratio after the change (step 703). When the ratio of failed processors 100 is less than the posterior faulty processor ratio as a result of the comparison, the switching operation from the current processor group 10 to the standby processor group 20 is not effected. The switching controller 305 waits for a report of failure from the monitor processor 11 or a subsequent point of change of the faulty processor ratio.

When the anterior ratio before the change is resultantly equal to or larger than the posterior faulty processor ratio, there are conducted operations (steps 704 to 706) similar to those described above (step 604 and subsequent steps of FIG. 6) and then the switching operation is carried out from the current processor group 10 to the standby processor group 20.

Next, description will be given of another embodiment according to the present invention. In the above embodiment, the switching operation from the current processor group 10 to the standby processor group 20 is accomplished on the basis of the faulty processor ratio. In contrast therewith, the switching operation in the other embodiment is carried out according to the number of failed processors.

Figure 8:
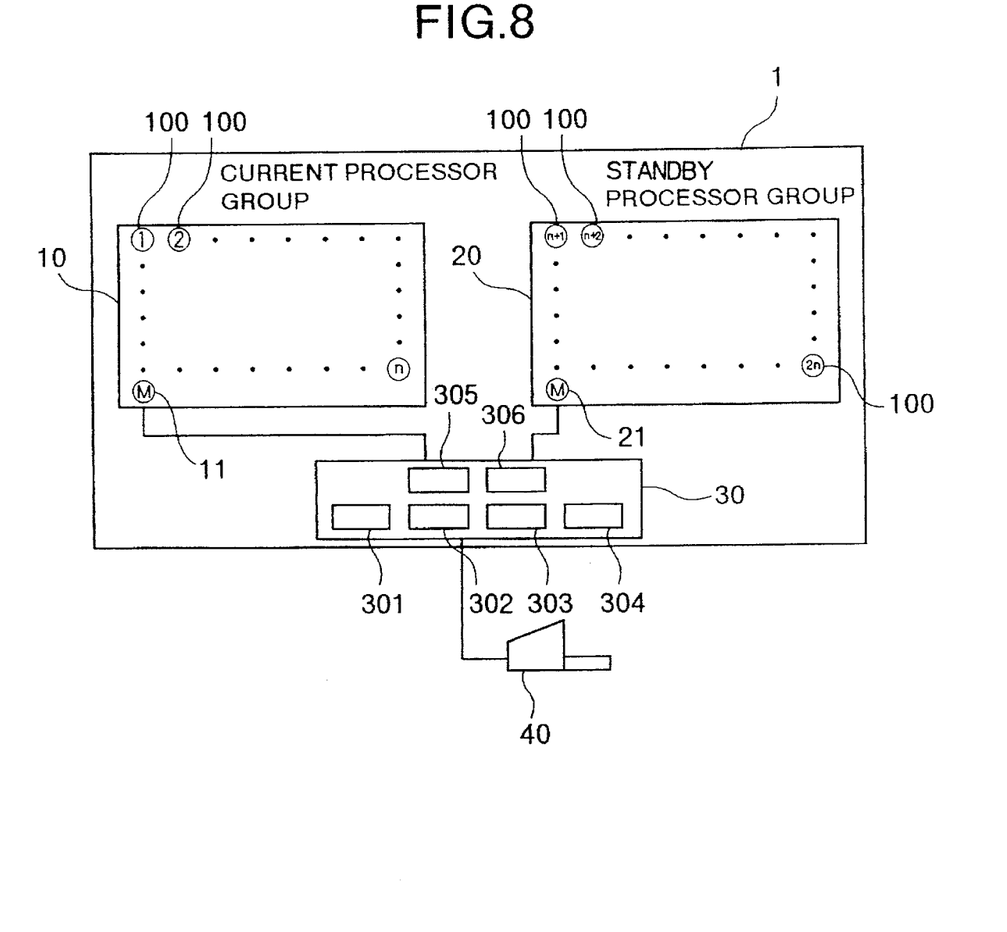
FIG. 8 is a block diagram showing another embodiment of the parallel processor system according to the present invention.

In a parallel processor system of the embodiment shown in FIG. 8, the processor control section 30 includes, in addition to the constituent components of the system 1 of FIG. 1, a counter 306 for counting the number of failed processors when a report of processor failure is received from the monitor processor 11. In the scheduling table 302, there are set the number of faulty processors determined according to the amount of job processing at each preset point of time. The other configurations are the same as those of the embodiment of FIG. 1 and hence description thereof will be avoided.

Figure 9:
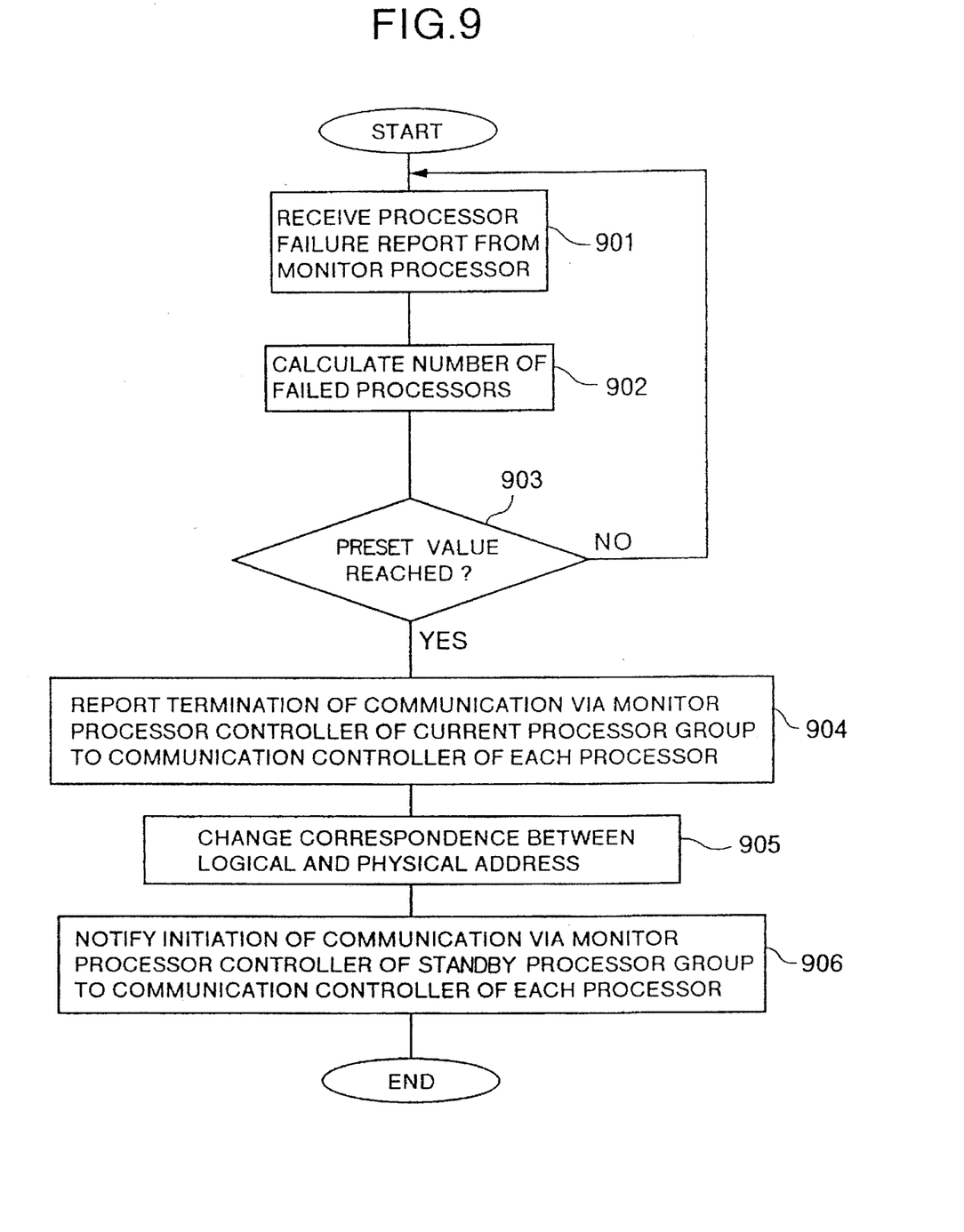
FIG. 9 is a flowchart showing operation of the processor control section in a processor group switching operation.

Referring now to FIG. 9, description will be given of operation of the processor controller 30 when a notification of a failure in a processor 100 is received from the monitor processor 11.

On receiving the report of processor failure from the monitor processor 11 (step 901), the counter 306 counts the number of failed processors 100 (step 902). The change-over controller 305 then compares the resultant number of failed processors 100 with the number of faulty processors preset in the scheduling table 302 corresponding to the time indicated by the timer 303 (step 903). As a result of the comparison, when the number of failed processors is less than that indicated in the table 302, the switching operation from the current processor group 10 to the standby processor group 20 is not effected. The change-over controller 305 waits for reception of a subsequent notification from the monitor processor 11.

When the number of failed processors is equal to or more than that indicated in the table 302 as a result of the comparison, the system conducts operation (steps 904 to 906) similar to that of the first embodiment (step 604 and subsequent operations of FIG. 6) and then replaces the current processor group 10 with the standby processor group 20.

Figure 10:
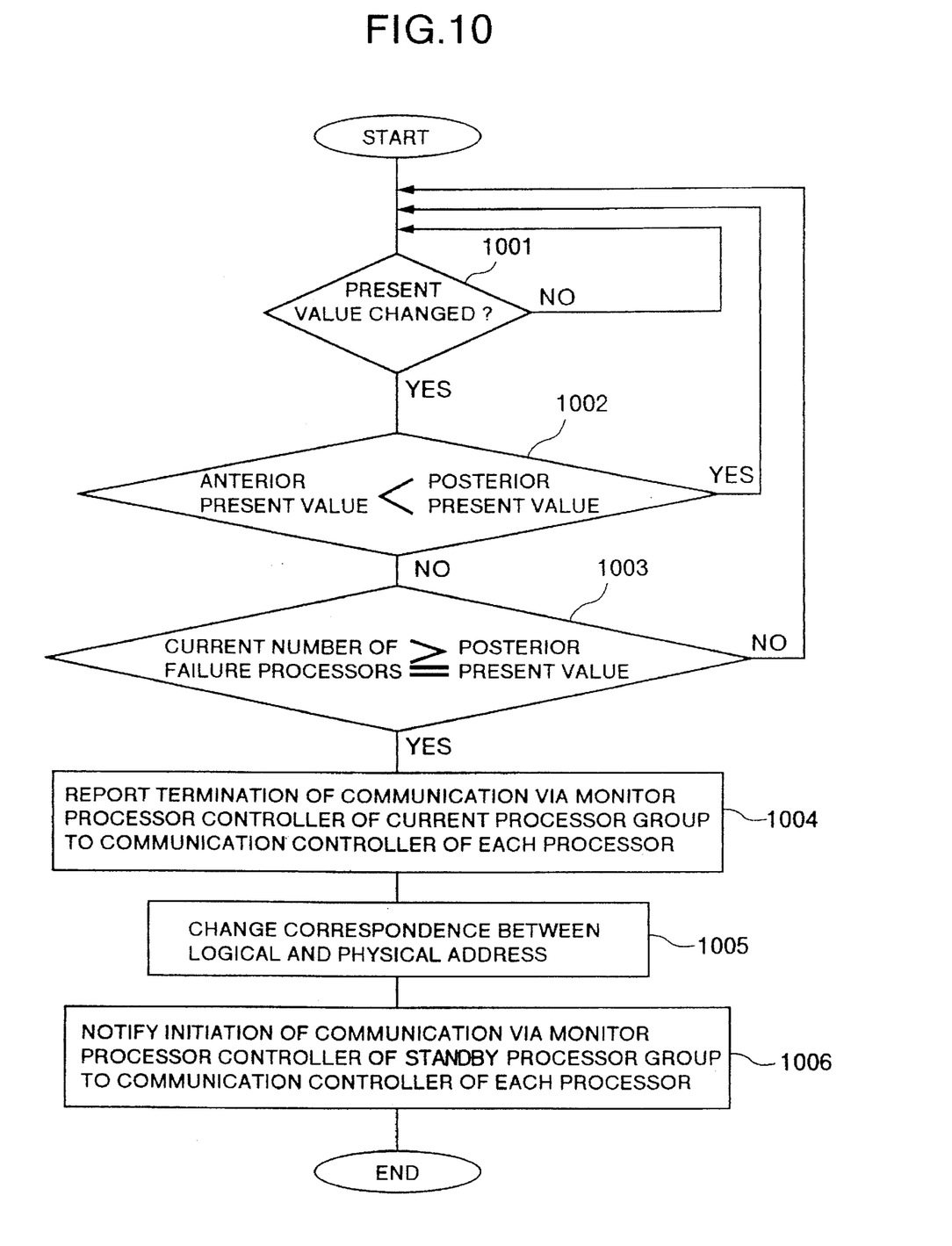
FIG. 10 is a flowchart showing operation of the processor control section when the number of faulty processors is changed.

Referring now to FIG. 10, description will be given of operation of the processor control section 30 when the number of faulty processors is changed in the scheduling table 302.

When the timer 303 indicates a new point of time, the switching control section 305 determines whether or not the number of faulty processors is changed in the scheduling table 302 (step 1001). If the number is altered, the controller 305 compares the value of the number used up to this point of time and that of the number to be subsequently employed (step 1002). As a result, when the latter is equal to or more than the former, the switching operation from the current processor group 10 to the standby processor group 20 is not effected. As described above, the change-over controller 305 waits for reception of a subsequent failure notification from the monitor processor 11 or a subsequent change in the number of faulty processors.

As a result of the comparison, when the posterior value is less than the anterior value, the change-over controller 305 compares the number of failed processors 100 counted by the counter 306 up to the pertinent point of time with the posterior number of faulty processors to be subsequently used (step 1003). If the the number indicated by the counter 306 is less than the posterior number of faulty processors 100, the system conducts the change-over operation from the current processor group 10 to the standby processor group 20. Namely, the change-over controller 305 waits for a failure notification from the monitor processor 11 or a subsequent change in the number of faulty processors.

If the the number indicated by the counter 306 is resultantly equal to or more than the number of faulty processors 100, there is achieved operations (steps 1004 to 1006) similar to those (step 604 and subsequent operations of FIG. 6) of the first embodiment and then the switching controller 305 conducts the change-over operation from the current processor group 10 to the standby processor group 20.

Description has been given of the present invention by reference to the embodiments. However, it is to be appreciated that the present invention is not restricted by the embodiments and can be changed or modified within the scope and spirit of the present invention.

For example, although the parallel processor system includes one current processor group and one standby processor group in the description of the embodiments, it is also possible to use a plurality of current processor groups and a plurality of standby processor groups. In such a case, there can be considered various including, for example, a construction having two or more current processor groups and one standby processor group and a configuration having two or more current processor groups and two or more standby processor groups.

In the change-over control method for use with a parallel process system in accordance with the present invention, the change-over operation is effected from the current processor group to the standby processor group on the basis of the faulty processor ratio or the number of faulty processors determined according to the amount of job processing. Consequently, when a failure occurs in a processor of the current processor group, when the job can be completely conducted by the remaining processors, the change-over operation is not carried out. Resultantly, processing performance of each processor can be efficiently utilized; moreover, the switching operation from the current processor group to the standby processor group can be effectively carried out.

In addition, the faulty processor ratio or the number of faulty processors can be arbitrarily specified at the pertinent point of time. Consequently, in accordance with the state of daily job processing, the change-over operation can be achieved from the current processor group to the standby processor group on the basis of the optimal processor utilization ratio at the respective points of time.

According to the parallel processor system of the present invention, when a processor fails during a job process, the job is continuously carried out when the remaining processors can fully accomplish the job. Namely, when the ratio of failed processors reaches the faulty processor ratio or the ratio related to the number of failed processors determined according to the job processing amount, the switching operation is executed from the current processor group to the standby processor group to continue the processing of the job. Consequently, the job can be processed with a sufficient processing performance by completely using the processing capability of each processor.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A parallel processor system, including a current processor group having a plurality of processors and a network connecting the processors to each other and a standby processor group including a plurality of processors and a network connecting the processors to each other, said parallel processor system comprising:

a monitor processor disposed in said current processor group and a monitor processor disposed in said standby processor group, said monitor processors controlling processing information of all processors in said current and standby processor groups, respectively;

a processor control section for executing a change-over operation from said current processor group to said standby processor group;

an address control table for storing therein physical and logical addresses of each processor of each of said current and standby processor groups with correspondence established therebetween;

a scheduling table for setting therein a faulty processor ratio determined according to an amount of job processing in said parallel processor system;

a storage section for storing therein processing information of each processor reported at a predetermined point of time from a monitor table disposed in said current processor group;

a change-over control section for calculating a ratio of failed processors in said current processor group at a pertinent point of time and comparing the calculated ratio with the faulty processor ratio set in the scheduling table when a report notifying occurrence of a failure in a processor is received from said monitor processor disposed in said current processor group, and executing a change-over operation of transferring the job processing from said current processor group to said standby processor group when the calculated ratio is equal to or more than the faulty processor ratio; and an operator's console connected to said processor control section for arbitrarily setting therefrom the faulty processor ratio to the scheduling table.

2. A parallel processor system according to claim 1, wherein said processor control section includes:

a timer for measuring time;

a scheduling table for having set therein, at a predetermined interval time, a faulty processor ratio determined according to an amount of job processing in said parallel processor system; and a change-over control section for calculating a ratio of failed processors in said current processor group at a pertinent point of time and comparing the calculated ratio with the faulty processor ratio set in the scheduling table corresponding to a point of time indicated by said timer when a report notifying occurrence of a failure in a processor is notified from said monitor processor disposed in said current processor group, and conducting a change-over operation of transferring the job processing from said current processor group to said standby processor group when the ratio is equal to or more than the faulty processor ratio.

3. A parallel processor system according to claim 1, wherein said processor control section further includes:

a counter for counting the number of failed processors when a report notifying occurrence of a failure in a processor is received from said monitor processor;

a scheduling table for setting therein the number of faulty processors determined according to an amount of job processing in said parallel processor system; and a change-over control section for comparing the number of failed processors counted by the counter with the number of faulty processors set in the scheduling table when a report notifying occurrence of a failure in a processor is received from said monitor processor disposed in said current processor group and conducting a change-over operation of transferring the job processing from said current processor group to said standby processor group when the counted number of failed processors is equal to or more than the number of faulty processors.

4. A parallel processor system according to claim 3, wherein said processor control section further includes:

a timer for measuring time;

a scheduling table for setting therein, at a predetermined interval of time, the number of faulty processors determined according to an amount of job processing in said parallel processor system; and a change-over control section for comparing the number of faulty processors set in the scheduling table corresponding to a point of time indicated by said timer with the number of failed processors counted by the counter when a report notifying occurrence of a failure in a processor is received from said monitor processor disposed in said current processor group and conducting a change-over operation of transferring the job processing from said current processor group to said standby processor group when the counted number of faulty processors is equal to or more than the number of faulty processors.

5. A parallel processor system according to claim 1, wherein the current processor group and the standby processor group each have the same number of processors.

6. A change-over control method for use with a parallel processor system including a current processor group having a plurality of processors and a network connecting the processors to each other, and a standby processor group having a plurality of processors and a network connecting the processors to each other, and said current processor group and said standby processor group both have a monitor processor disposed therein, and said parallel processor system further includes a processor control section, said method comprising the steps of:

determining a faulty processor ratio according to an amount of job processing in said parallel processor system;

setting the faulty processor ratio in said processor control section;

calculating, in said processor control section, a ratio of failed processors in said current processor group at a pertinent point of time when a report notifying an occurrence of a failure in a processor is received from the monitor processor disposed in said current processor group;

comparing the ratio of failed processors calculated by said processor control section with said faulty processor ratio; and executing a change-over operation of transferring job processing from said current processor group to said standby processor group when the calculated ratio of failed processors is equal to or more than said faulty processor ratio.

7. A change-over control method according to claim 6, including the further steps of:

reporting to said processor control section, at a preset point of time by the monitor processor disposed in said current processor group, processing information regarding each of the processors belonging to said current processor group;

storing the reported processing information in said processor control section;

notifying, by said processor control section, termination of communication to each of the processors belonging to said current processor group when the job processing is transferred from said current processor group to said standby processor group;

reporting logical addresses corresponding to respective physical addresses of each of the processors belonging to said standby processor group and initiating communication to each of the processors belonging to said standby processor group;

reading, by the monitor processor disposed in said standby processor group, the processing information from said processor control section and transmitting the processing information to each of the processors belonging to said standby processor group; and receiving, at each of the processors belonging to said standby processor group, the processing information from each of the processors belonging to said current processor group.

8. A change-over control method according to claim 6, further including the steps of:
   determining a number of failed processors, according to an amount of job processing;
   setting the determined number of failed processors in said processor control section;
   calculating, by said processor control section, the number of failed processors each time a report notifying occurrence of a failure in a processor is received from the monitor processor disposed in the current processor group;
   comparing the calculated number of failed processors, in place of said faulty processor ratio, with the determined number of faulty processors; and
   executing, when the calculated number of failed processors matches the number of faulty processors, a change-over operation of transferring job processing from said current processor group to said standby processor group.

9. A change-over method according to claim 6, wherein said current and standby processor groups both have the same number of processors therein.

10. A change-over control method for use with a parallel processor system including a current processor group having a plurality of processors and a network connecting the processors to each other, and a standby processor group having a plurality of processors and a network connecting the processors to each other, said current processor group and said standby processor group both include a monitor processor therein, and said parallel processor system includes a processor control section having a timer therein, said method comprising the steps of:
    determining a faulty processor ratio at a predetermined interval of time according to an amount of job processing in said parallel processor system;
    setting the determined faulty processor ratio in said processor control section;
    calculating, by said processor control section, a ratio of failed processors in said current processor group at a pertinent point of time when a report notifying an occurrence of a failure in a processor is received from said monitor processor disposed in said current processor group;
    comparing said calculated ratio of failed processors with said determined faulty processor ratio corresponding to a point of time indicated by said timer; and
    executing a change-over operation of transferring job processing from said current processor group to said standby processor group when said calculated ratio of failed processors is equal to or more than said determined faulty processor ratio.

11. A change-over method according to claim 10, including the further steps of:
    determining, in said processor control section, whether or not said determined faulty processor ratio before the pertinent point of time is different from a posterior faulty processor ratio to be employed thereafter whenever a time indicated by said timer is changed;
    comparing said determined faulty processor ratio with the posterior faulty processor ratio;
    calculating a second ratio of failed processors up to a particular point of time in said current processor group when the posterior faulty processor ratio is less than said determined faulty processor ratio;
    comparing the second calculated ratio of failed processors with the posterior faulty processor ratio; and
    executing a change-over operation of transferring job processing from said current processor group to said standby processor group when the second calculated ratio of failed processors is equal to or more than the posterior faulty processor ratio.

12. A change-over control method according to claim 10, further including the steps of:
    reporting to said processor control section, at a preset point of time by the monitor processor disposed in the current processor group, processing information regarding each of the processors belonging to said current processor group;
    storing the reported processing information in said processor control section;
    notifying, by said processor control section, termination of communication to each of the processors belonging to said current processor group when the job processing is transferred from said current processor group to said standby processor group;
    reporting logical addresses corresponding to respective physical addresses of each of the processors belonging to said standby processor group and initiating communication to each of the processors belonging to said standby processor group;
    reading, by the monitor processor disposed in said standby processor group, the processing information from said processor control section and transmitting the processing information to each of the processors belonging to said standby processor group; and
    receiving and executing, at each of the processors belonging to said standby processor group, the job processing from each of the processors belonging to said current processor group.

13. A change-over control method according to claim 10, further including the steps of:
    determining a number of failed processors, in place of said faulty processor ratio, according to an amount of job processing;
    setting the determined number of failed processors in said processor control section;
    calculating, by said processor control section, the number of failed processors each time a report notifying occurrence of a failure in a processor is received from the monitor processor disposed in the current processor group;
    comparing the calculated number of failed processors with the determined number of faulty processors corresponding to the time indicated by said timer; and
    executing, when the calculated number of failed processors matches the number of faulty processors, a change-over operation of transferring job processing from said current processor group to said standby processor group.

14. A change-over method according to claim 7, further including the steps of:
    determining, by said processor control section, whether or not the calculated number of failed processors before the pertinent point of time is different from a posterior number of failed processors to be utilized thereafter whenever a time indicated by said timer is changed;
    comparing the calculated number of failed processors with the posterior number of failed processors;
    comparing, when the posterior number of failed processors is less than the calculated number of failed processors, the number of failed processors at a present point in time in said current processor group with the posterior number of failed processors; and executing a change-over operation of transferring job processing from said current processor group to said standby processor group when the number of failed processors up to the present point in time in said current processor group is equal to or more than the posterior number of failed processors.

15. a change-over method according to claim 10, wherein said current and standby processor groups both have the same number of processors therein.

* * * * *

UNITED STATES PATENT AND TRADEMARK OFFICE
CERTIFICATE OF CORRECTION

PATENT NO. : 5,652,833
DATED : July 29, 1997
INVENTOR(S) : TAKIZAWA, et al.

It is certified that error appears in the above-indentified patent and that said Letters Patent is hereby corrected as shown below:

On the cover page please insert --[30] Foreign Application Priority Data March 15, 1994 [JP] Japan...06-069892--.

Signed and Sealed this

Second Day of December, 1997

Attest:

BRUCE LEHMAN

Attesting Officer

Commissioner of Patents and Trademarks